Feb. 24, 1959   E. PELL   2,874,917
CONTROL SYSTEM FOR ELECTRIC REEL MOTORS
Filed Feb. 7, 1955   3 Sheets-Sheet 1

Inventor
Eric Pell
By H.R. Rather
Attorney

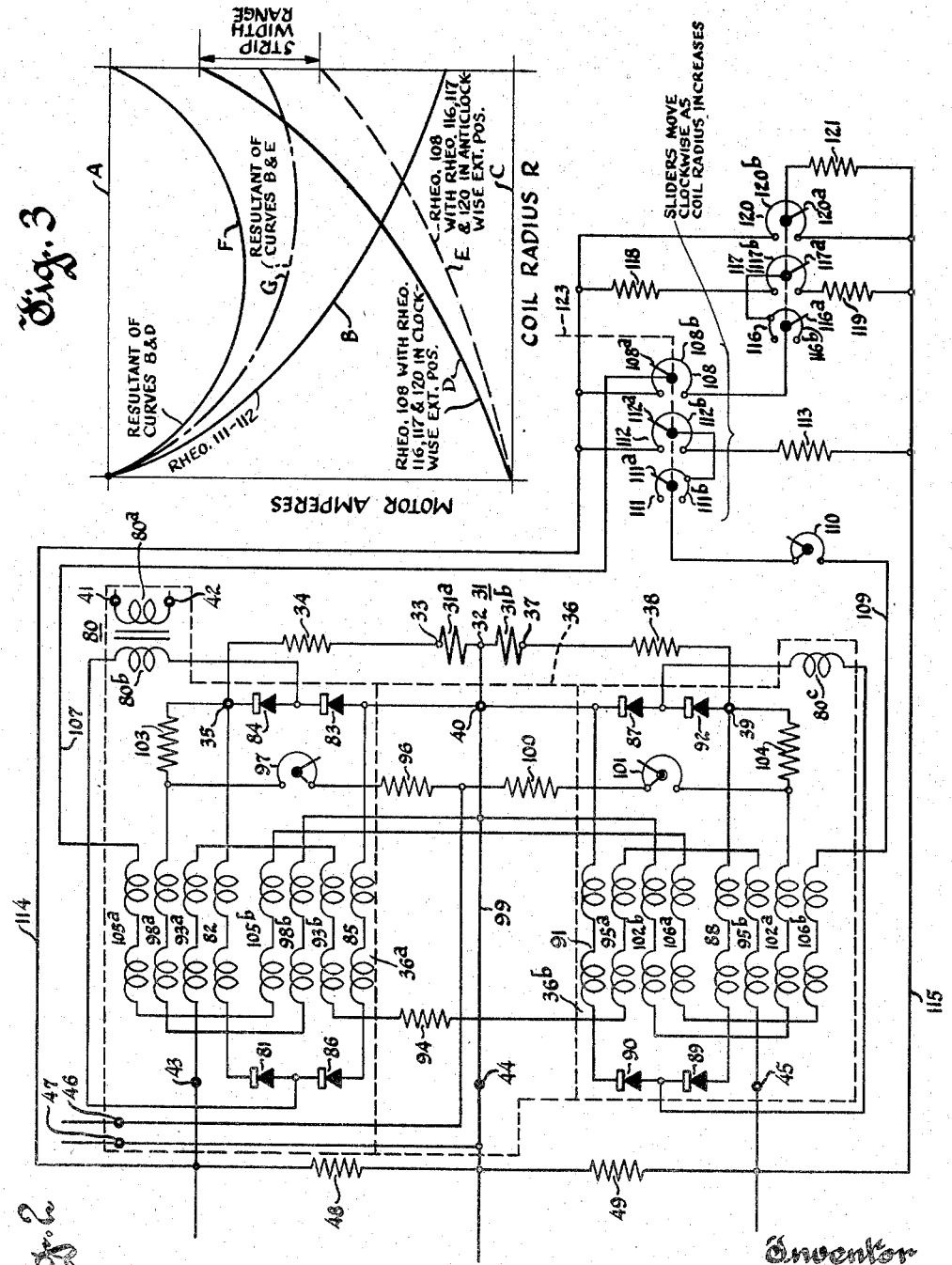

# 2,874,917

CONTROL SYSTEM FOR ELECTRIC REEL MOTORS

Eric Pell, Wauwatosa, Wis., assignor to Cutler-Hammer, Inc., Milwaukee, Wis., a corporation of Delaware Application February 7, 1955, Serial No. 486,429

12 Claims. (Cl. 242—75.51)

This invention relates to a control system for electric reel motors.

In my application Serial No. 370,287, filed July 27, 1953, now Patent No. 2,765,989 of October 9, 1956. I disclose and claim a control system for reel motors affording inertia compensation for changes in the combined effect of the fixed inertia of the reeling apparatus and the variable inertia material of the reeled so as to insure that the strip material will be coiled under constant tension during periods of acceleration and deceleration of the millwork rolls. Such system entails the use of two special motor-generator sets making the system relatively costly.

It is the object of the present invention to provide an improved control system of the aforementioned type utilizing magnetic amplifiers thereby affording a substantial reduction in cost as well as providing improved response of the regulating system.

Other objects and advantages of the invention will hereinafter appear.

The accompanying drawings illustrate a preferred embodiment of the invention which will now be described in detail, it being understood that the embodiment illustrated is susceptible of various modifications without departing from the scope of the appended claims.

In the drawings:

Fig. 2 is a diagrammatic showing in greater detail of a portion of the control system of Fig. 1.

Fig. 3 is a graph depicting certain relationship in a portion of the control system shown in Figs. 1 and 2.

Figure 1:
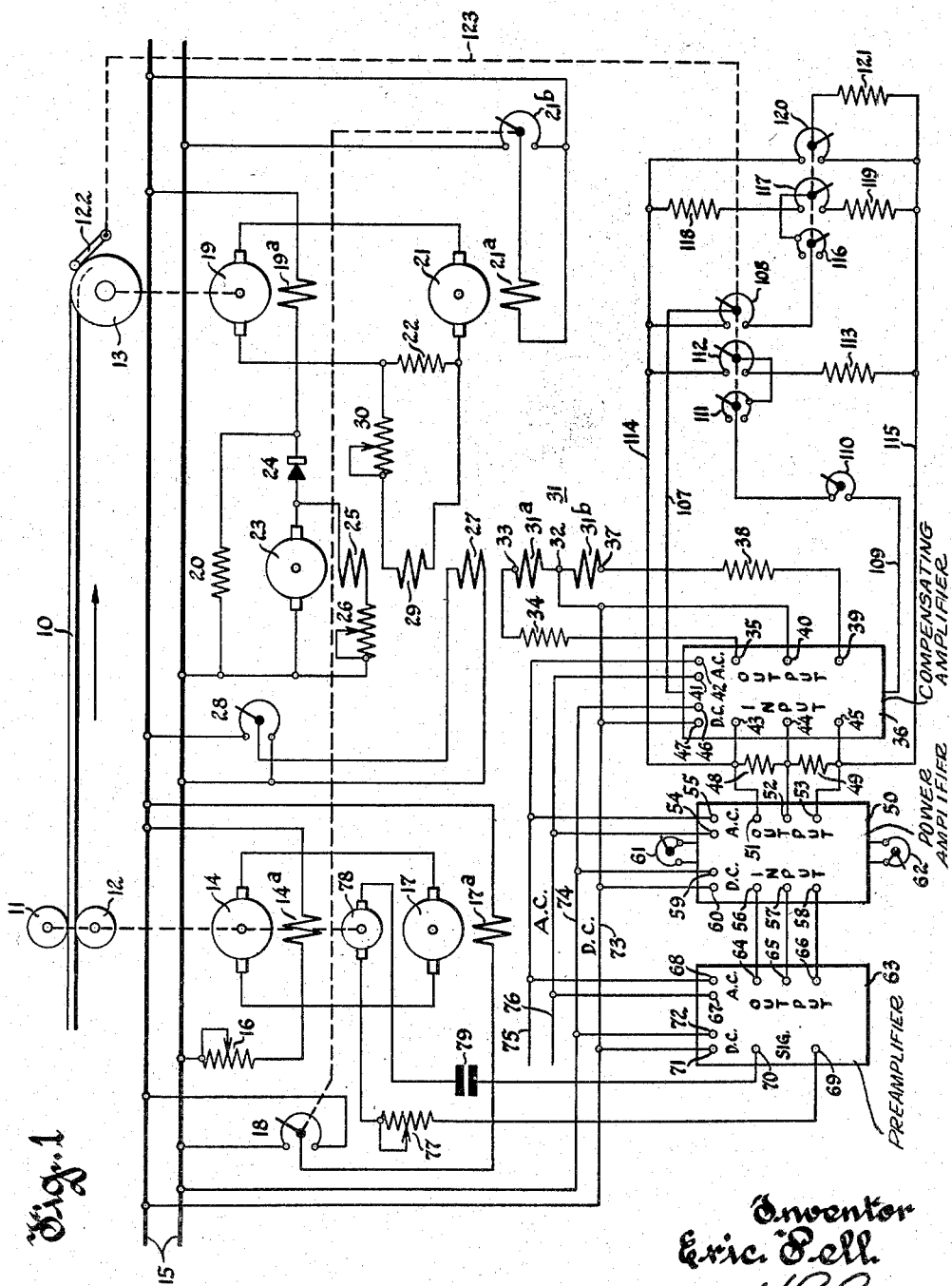
Figure 1 is a diagrammatic drawing of a reeling mechanism and a control system therefore incorporating the invention.

Referring to Fig. 1, it shows a length of material 10, such as a strip of sheet steel, passing through millwork rolls 11 and 12 in the direction of the arrow and being coiled on a windup reel 13.

The millwork rolls 11 and 12 are driven by a direct current motor 14 having a separately excited field winding 14a. Field winding 14a is connected across opposite sides of a source of constant direct current voltage 15 in series with an adjustable resistor 16. Power is supplied to the armature of motor 14 by an adjustable voltage generator 17, the armature of which is connected in a closed loop with the armature of motor 14. Generator 17 is provided with a separately excited field winding 17a which is connected at one end to one side of source 15 and at its other end to an adjustable slide wire of a potentiometer rheostat 18 which is connected across opposite sides of source 15. Generator 17 is preferably driven at substantially constant speed by any suitable driving means.

The wind-up reel 13 is driven by a direct current motor 19 having a separately excited field winding 19a connected across source 15 in series with a resistor 20. Power is supplied to the armature of motor 19 by an adjustable voltage generator 21, the armature of which is connected in a closed loop with the armature of motor 19 in series with a resistor 22. Generator 21 is provided with a separately excited field winding 21a which at one end is connected to one side of source 15 and at its other end to an adjustable slide wire of a potentiometer rheostat 21b, which is connected across opposite sides of source 15. The slider of rheostat 21b is preferably mechanically coupled with the slider of rheostat 18, as depicted by the broken line connection therebetween, so that movement of one will effect corresponding movement of the other. Generator 21 is preferably driven at substantially constant speed by any suitable driving means.

A bucking exciter 23 in series with a rectifier 24 is connected across resistor 20 and is driven at substantially constant speed by any suitable driving means. As will be hereinafter more fully explained, exciter 23 constitutes a current regulator for motor 19, and according to its output acts to vary the excitation of the field winding 19a of the motor by counter-acting the excitation afforded by the source of supply 15. When the output of the exciter 23 is high, its bucking action is high, and as a result the excitation of field winding 19a of motor 19 is low. The bucking action of exciter 23 reaches a maximum value, which because of rectifier 24 cannot be exceeded, when its output equals the voltage across the resistor 20. Conversely, when the output of exciter 23 is low its bucking action will be low and the excitation of field winding 19a of motor 19 will be high. When exciter 23 is operating at high output voltage, reversal of current through the exciter is prevented by rectifier 24 to insure against weakening winding 19a below a certain predetermined minimum value.

Exciter 23 is provided with a self-excited field winding 25 connected across its terminals in series with an adjustable resistor 26. Winding 25 supplies the necessary ampere turns for maintaining the field of the exciter at any point within its regulating range. Further, exciter 23 is provided with a reference field winding 27, which at one end is connected to one side of the supply source 15 and at its other end to a slider of a potentiometer rheostat 28 which is connected across opposite sides of supply source 15. Exciter 23 is also provided with a signal field winding 29 which is connected across the resistor 22 in series with an adjustable resistor 30.

Exciter 23, as thus far described under steady state conditions, i. e., material 10 advancing from millwork rolls 11 and 12 at constant linear speed, functions in a well-known manner to afford constant horsepower output of motor 19, so that the material 10 will be coiled on reel 13 under constant tension. According to the adjustment of rheostat 28, reference field winding 27 will afford a fixed number of ampere turns which determine the maximum output current in the reel motor loop. The signal field winding 29 provides an equal number of ampere turns for counter-acting the ampere turns of the reference field winding 27. Assuming steady state conditions, when reel 13 is near empty condition at the start of reeling, the output of exciter 23 is maximum, and affords maximum bucking action. Consequently, excitation of field winding 19a of motor 19 is at a minimum, and the motor rotates at high speed. As the diameter of the coil of material 10 on reel 13 increases, the motor 19 will decrease in speed with the result that current flow through the armature of the motor tends to increase. As the armature current tends to increase the voltage drop across resistor 22 also tends to increase correspondingly, and as a result, the excitation of signal field winding 29 is increased to afford some small marginal increase in its number of ampere turns for counter-acting the ampere turns of the reference field winding 27. As a result, the output of exciter 23 is reduced, and the excitation of the field winding 19ª of motor 19 is correspondingly increased. Increased excitation of winding 19ª compensates for the reduced speed of the motor so as to maintain the counter voltage in the armature of motor 19 and the armature current to the constant values determined by the setting of the rheostat 28.

At the start of reeling of material 10, following threading thereof through the millwork rolls 11 and 12, and anchoring of the leading end on roll 13, the motor 14 is accelerated from rest to some preset speed. In order to wind the material 10 on reel 13 at constant tension during such accelerating period of motor 14, it is necessary to increase the torque of motor 19 by an amount necessary to overcome the inertia of reel 13 and the armature of motor 19. This is accomplished in the present control system by modifying the action of exciter 23 in relation to the rate of change of speed of motor 14 and the change in diameter of the coil of material on reel 13. The preferred additional means utilized in the present control system for effecting this type of control will now be described.

Exciter 23, in addition to its aforedescribed field windings, is provided with a field winding 31 which may be termed the inertia compensating winding. Winding 31 has a center tap 32 dividing the same into equal sections 31ª and 31ᵇ. Section 31ª has an end terminal 33 which is connected in series with a resistor 34 to the output terminal 35 of a special push-pull type magnetic amplifier 36. Section 31ᵇ is connected at its end terminal 37 in series with a resistor 38, like resistor 34, to output terminal 39, and center tap terminal 32 of winding 31 is connected to the output terminal 40 of amplifier 36.

Amplifier 36 has a pair of A. C. power terminals 41 and 42, signal input terminals 43, 44 and 45 and D. C. input terminals 46 and 47. A ballast resistor 48 is connected across terminals 43 and 44 and a similar ballast resistor 49 is connected across terminals 44 and 45. The internal details and compensating adjustments for amplifier 36 will be hereinafter described in detail.

A push-pull magnetic power amplifier 50 has its output terminals 51, 52 and 53 connected to input terminals 43, 44 and 45, respectively, of amplifier 36. Amplifier 50 is also provided with A. C. power terminals 54 and 55, signal input terminals 56, 57 and 58, D. C. input terminals 59 and 60, and feed-back adjusting rheostats 61 and 62. Although not shown it may be assumed that the rheostats 61 and 62 are connected in circuit with feed-back control windings in the respective push-pull sections of amplifier and according to their adjustments control the amount of negative feed back.

A push-pull magnetic preamplifier 63 has its output terminals 64, 65 and 66 connected to input terminals 56, 57 and 58, respectively, of amplifier 50. Preamplifier 63 is also provided with A. C. power terminals 67 and 68, signal input terminals 69 and 70, and D. C. input terminals 71 and 72.

The respective D. C. input terminals of amplifiers 36, 50 and 63 are connected with D. C. conductors 73 and 74 that are connected to the D. C. lines 15. The respective A. C. power terminals of these amplifiers are connected to an A. C. power supply source comprising the lines 75 and 76.

Signal input terminal 69 of amplifier 63 is connected in series with an adjustable resistor 77 to one terminal of a tachometer generator 78 which has its armature mechanically coupled to the shaft of mill motor 14 for drive by the latter. The other signal input terminal 70 of amplifier 63 is connected in series with a capacitor 79 to the other terminal of generator 78. It may be assumed that the output voltage of generator 78 will be directly proportional to the speed of motor 14, and that for any change in speed of the latter that the change in output voltage of generator 78 will be in accordance therewith.

When motor 14 is accelerating from rest to working speed, the output voltage will change accordingly. Thus current will flow in the input control windings of amplifier 63 (not shown) in such a direction as to provide a voltage across output terminals 64 and 65. Accordingly an output voltage will appear across output terminals 51 and 52 of amplifier 50 to which the input terminals 43 and 44 of amplifier 36 will be subjected. Thus ampere turns will be developed in section 31ª of the inertia compensating winding 31. When the motor reaches its steady state speed there will be no further current flow through the input control windings of amplifier 63 due to the blocking charge on capacitor 79, and consequently amplifier 63, 50 and 36 will be turned off so that substantially zero ampere turns will be developed in either of the sections 31ª and 31ᵇ of winding 31 of the regulator 23.

When motor 14 decelerates from its working speed to rest, the output voltage of generator 78 will decrease in correspondence with the rate of decrease in speed of motor 14. Current will then flow in the reverse direction through the input control windings of amplifier 63. Under these circumstances it may be seen that an output voltage is developed across output terminals 65 and 66 and that corresponding ampere turns are developed in section 31ᵇ of winding 31. The magnitude of ampere turns developed by section 31ᵇ at any instant will of course be proportional to the rate of decrease in speed of motor 14 at that instant.

The just described action of trachometer generator 78, capacitor 79, amplifiers 63, 50 and 36, and field winding 31 in response to acceleration or deceleration of motor 14, without the other apparatus to be described, would be such as to modify the regulating action of exciter 23 to maintain constant tension of the strip material under accelerating and decelerating conditions for some predetermined average value of inertia of the reeling machinery and the coiled strip. If such type of control is satisfactory, amplifier 36 can be dispensed with, and output terminals 51, 52 and 53 of amplifier 50 can be then directly connected to terminal 33, 32 and 37, respectively, of inertia compensating winding 31. However, the present invention contemplates more precise control of exciter 23 in relation to the constantly changing inertia of the coiled strip, and wherein amplifier 36 and additional control apparatus now to be described is utilized.

Amplifier 36, as shown in greater detail in Fig. 2, comprises the push-pull sections designated by the inner broken line rectangles 36ª and 36ᵇ within the outer rectangle 36. The A. C. power terminals 41 and 42 are connected to primary winding 80ª of a transformer 80 which has secondary windings 80ᵇ and 80ᶜ which are respectively associated with the sections 36ª and 36ᵇ of the amplifier. In the section 36ª when the potential of the upper end of winding 80ᵇ is positive, current will flow through half-wave rectifier 81, A. C. power winding 82, resistor 34, winding section 31ª and a half-wave rectifier 83 to the lower end of winding 80ᵇ. When the potential of the lower end of winding 80ᵇ is positive, then current will flow through a half-wave rectifier 84, resistor 34, winding section 31ª, A. C. power winding 85 and a half-wave rectifier 86 to the upper end of winding 80ᵇ.

In section 36ᵇ when the potential of the upper end of winding 80ᶜ is positive, current will flow, through a half-wave rectifier 87, winding section 31ᵇ, resistor 38, A. C. power winding 88, half-wave rectifier 89 to the lower end of winding 80ᶜ. When the potential of the lower end of winding 80ᶜ is positive, current will flow through a half-wave rectifier 90, A. C. power winding 91, winding section 31ᵇ, resistor 38 and a half-wave rectifier 92 to the upper end of winding 80ᶜ.

Amplifier section 36ª is provided with an input control winding section 93ª which is connected at one end to input terminal 43 and which is connected at its other end in series with another control winding section 93ᵇ, a resistor 94, and input control winding section 95ᵃ and 95ᵇ of amplifier section 36ᵇ which have connection with input terminal 45. D. C. input terminal 46 is connected in series (all in amplifier section 36ᵃ), with a resistor 96, an adjustable resistor 97, and bias-feed back control winding section 98ᵃ and 98ᵇ to a conductor 99, which has connection with the other D. C. input terminal 47 and with signal input terminal 44 and output terminal 40. D. C. input terminal 46 is also connected in series (all in amplifier section 36ᵇ), with a resistor 100, an adjustable resistor 101 and bias-feed back winding sections 102ᵃ and 102ᵇ to line 99. Output terminal 35 is connected through a resistor 103 to the point common between adjustable resistor 97 and winding section 98ᵃ to provide the feedback connection to winding sections 98ᵃ and 98ᵇ. Similarly, output terminal 39 is connected through a resistor 104 to the point common to adjustable resistor 101 and winding section 102ᵃ to provide the feed-back connection for winding section 102ᵃ to provide the feed-back connection for winding sections 102ᵃ and 102ᵇ.

It may be assumed the winding sections 98ᵃ and 98ᵇ act differentially with respect to winding sections 93ᵃ and 93ᵇ, and similarly that winding section 102ᵃ and 102ᵇ act differentially with respect to winding section 95ᵃ and 95ᵇ. It will be apparent that the ampere turns developed in winding section 98ᵃ and 98ᵇ depends upon the setting of adjustable resistor 97, the voltage across output terminals 35 and 40 and the resistance of resistor 96, and similarly that the ampere turns developed in winding sections 102ᵃ and 102ᵇ depends upon the setting of adjustable resistor 101, the output voltage across output terminals 39 and 40 and the resistance of resistor 100.

If amplifier sections 36ᵃ and 36ᵇ were not provided with any other control windings, they would function as straight push-pull amplifiers with more or less conventional type of negative feed back. However, in accordance with the present invention, amplifier section 36ᵃ is provided with additional series connected compensating control winding sections 105ᵃ and 105ᵇ, and amplifier section 36ᵇ is similarly provided with series connected compensation control winding sections 106ᵃ and 106ᵇ which are connected in series with the aforementioned winding sections 105ᵃ and 105ᵇ.

Winding section 105ᵃ is connected through a conductor 107 to the slider 108ᵃ of a rheostat 108, and winding section 106ᵇ is connected through a conductor 109 and an adjustable resistor 110 to the slider 111ᵃ of a rheostat 111 which forms part of a special form of compound rheostat set additionally including a rheostat 112. Rheostat 112 has its slider 112ᵃ connected to resistance element 111ᵇ of rheostat 111 and has its resistance element 112ᵇ connected in series with a resistor 113 across conductors 114 and 115 which are connected to input terminals 43 and 45, respectively. The resistance element 108ᵇ of rheostat 108 is connected at one end to conductor 114 and is connected at its other end to the slider 116ᵃ of a rheostat 116 which comprises part of another special compound rheostat set that also includes the rheostat 117. Rheostat 117 has its slider 117ᵃ connected to resistance element 116ᵇ of rheostat 116 and has its resistance element 117ᵇ connected in series with resistors 118 and 119 across conductors 114 and 115. A rheostat 120 has its slider 120ᵃ connected in series with a resistor 121 to conductor 115 and has its resistance element 120ᵇ connected across conductors 114 and 115.

The sliders of rheostats 108, 111 and 112 are mechanically connected together, and a follow-up mechanism schematically depicted at 122 and acting through a mechanical connection, depicted by the broken line 123, is effective to move these sliders in unison between counter-clockwise and clockwise extreme positions on their respective associated resistance elements as the coiling of strip material on reel 13 progresses from empty to full reel condition. The sliders of rheostats 116, 117 and 120 are mechanically connected together for manual adjustment in unison on their respective associated resistance elements.

It will be apparent that the voltage difference between conductors 114 and 115 will be proportional to the rate of acceleration or deceleration of the mill motor 14, and hence the strip of material 10. During acceleration it may be assumed that conductor 114 will be at the higher potential, and during deceleration that conductor 115 will be at the higher potential.

Assuming that the resistance elements of rheostats 108, 111 and 112 are appropriately selected and tapered, as will be hereinafter more fully explained, the concurrent adjustment of the sliders of these rheostats between their counter-clockwise extreme positions toward their clockwise extreme positions results in a predetermined pattern of potential variation across the compensation control winding section 105ᵃ, 105ᵇ, 106ᵃ and 106ᵇ for a given potential difference across conductors 114 and 115, which corresponds to a given rate of acceleration or deceleration of the strip 10. Such predetermined potential variation across the compensation control winding sections causes the output of amplifiers 36 to winding section 31ᵃ and 31ᵇ, as the case may be, to be so modified that exciter 23 in its regulation of reel motor 19 accurately compensates for the fixed inertia effects of the reel and its associated driving apparatus, and the continually changing inertia effect of the strip material coiled on reel 13. In other words, the compensation effected is in accordance with the total inertia effect of the reel machinery and the strip coiled on the reel at any instant during the period of acceleration and deceleration. The rheostat set comprising rheostats 116 and 117 provides for adjusting the aforementioned potential variation pattern for different strip widths or to different weights per unit area of the strip material. Rheostat 120, whose slider is adjusted in unison with the sliders of rheostats 116 and 117, considered together with resistor 121, is so complementally formed to rheostats 116 and 117 and resistors 118 and 119 in respect of resistance values and tapers that there is no change in the load resistance across conductors 114 and 115 caused by any adjustments of the sliders of rheostats 116, 117 and 120.

Let it be assumed that the slider of rheostat 108 is uncoupled from the sliders of rheostats 111 and 112 and is maintained in its counter-clockwise extreme position as the sliders of rheostats 111 and 112 are moved from their counterclockwise to their clockwise extreme positions during the coiling of the strip. Then the potential difference across the compensation control winding sections of amplifier 36, by suitable selection of resistance values and tapers for the resistance elements of rheostats 111 and 112, can be made to increase in proportion to the ordinate distance between the upper horizontal line A and the curve B of Fig. 3. Thus under the assumed condition, the change in motor amperes of reel motor 19 effected by exciter 23 would follow, curve B with such change compensating for the fixed inertia effect of reel 13 and the driving apparatus. The compound rheostat set comprising rheostats 111 and 112 is preferably of the type disclosed and claimed in my Patent No. 2,634,386 granted April 7, 1953, and which affords constant equivalent resistance in the circuit where it is connected regardless of the adjustment of the sliders.

Now let it be assumed with the sliders of rheostats 116, 117 and 120 set in their clockwise extreme position and the sliders of rheostats 111 and 112 maintained in their counter-clockwise extreme positions, that the slider of rheostat 108 is moved from its counterclockwise to its clockwise extreme position during coiling of the strip under the aforementioned predetermined rate of acceleration of the strip. Then, if the resistance element of rheostat 108 is suitably tapered the potential difference across the compensation control winding of amplifier 36 will be proportional to the ordinate distance from the horizontal line C and the curve D for various positions of the slider of rheostat 108. Correspondingly, under the last assumed conditions for the various rheostats, the amperes supplied to reel motor 14 by action of exciter 23 would increase in accordance with the curve D to compensate for the continually increasing inertia effect of the coiled strip material as the radius R of such coiled material increases. If instead of the sliders of rheostats 116, 117 and 120 being maintained in their clockwise extreme positions they were maintained in their counter-clockwise extreme positions under the last described conditions, then the compensating amperes effected for reel motor 19 would be in accordance with the broken line curve "E." For intermediate position of the sliders of rheostats 116, 117 and 120, there will be corresponding curves falling between the limits of curves D and E, the curve to be selected being dependent upon the width and weight per unit area of strip being coiled.

Inasmuch as the sliders of rheostats 108, 111 and 112 are moved in unison, the actual compensation motor amperes effected by exciter 23 will be in accordance with the curve F of Fig. 3, or for the other extreme setting of the sliders of rheostats 116, 117 and 119 in accordance with the broken line curve G. The curve F is the resultant obtained from combining curves B and D, and curve G the resultant obtained from combining curves B and E. For various intermediate positions of the sliders of rheostats 116, 117 and 119 there will be other resultant motor ampere compensation curves falling between curves F and G.

If preferred, an impulse transformer may be substituted for capacitor 79 in the connections between tachometer generator 78 and input terminals 69 and 70 of amplifier 63 to provide an input potentiometer which varies in accordance with the rate of change in speed of the mill motor.

Figure 4:
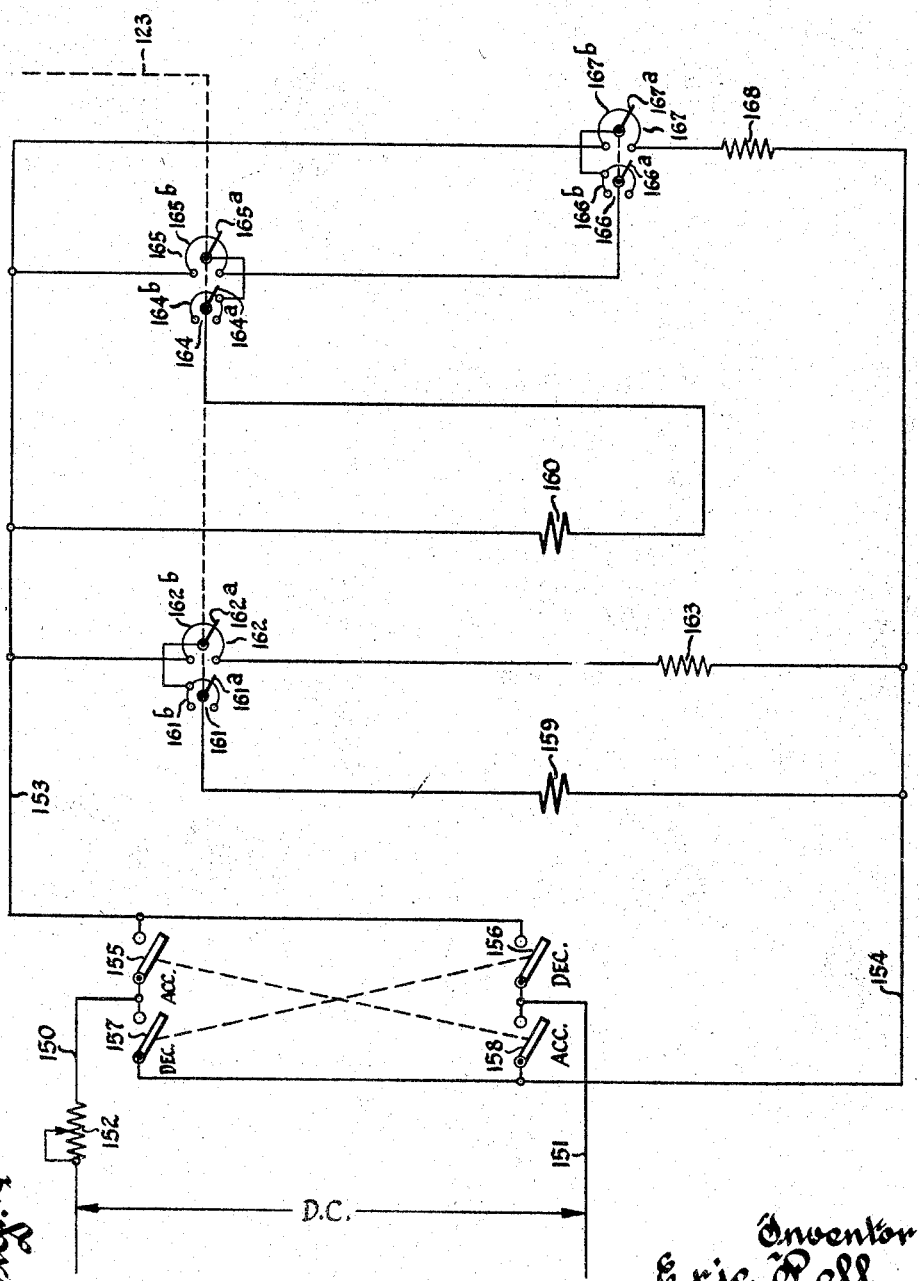
Fig. 4 is a diagrammatic showing of a portion of a modified form of control system.

Fig. 4 illustrates a modification of a portion of the system of Figs. 1 and 2 which dispense with the use of tachometer generator 78, field winding 31, the magnetic amplifiers and other elements connected therebetween, and utilizes certain other apparatus in lieu thereof which will now be described in detail. More particularly, the modified form comprises a source of constant, but adjustable D. C. potential provided by buses 150 and 151 and an adjustable resistor 152 connected in line 150. A lead wire 153 is connectable to line 150 through closure of a switch 155 and is connectable to bus 151 through closure of a switch 156. A lead wire 154 is connectable to bus 150 through closure of a switch 157 and is connectable to bus 151 through closure of a switch 158. In practice, when mill motor 14 is accelerated, switches 155 and 158 would be closed, and when motor 14 is decelerating switches 156 and 157 would be closed.

Exciter 23 in the modified form is provided with two inertia compensating windings 159 and 160. Winding 159 is connected at one end to line 154 and is connected at its other end to slider 161ª of a rheostat 161 which is part of a compound rheostat set like that comprising rheostat 111—112 in Figs. 1 and 2. Resistance element 161ᵇ is connected to the slider 162ª of the other rheostat 162 of such set. Resistance element 162ᵇ is connected across lines 153 and 154 in series with a resistor 163. Winding 160 is connected at one end to line 153 and at its other end to slider 164ª of a rheostat 164 which is part of a compound rheostat set 164—165. Resistance element 164ᵇ is connected to slider 165ª of the other rheostat of each set. Resistance element 165ᵇ is connected at one end to line 153 and at its other end to the slider 166ª of a rheostat 166 which comprises part of a compound rheostat set like that of rheostat set 116—117 of Figs. 1 and 2. Resistance element 166ᵇ is connected to slider 167ª of the other rheostat 167 of the last described rheostat set. Rheostat 167 has its resistance element 167ᵇ connected in series with a resistor 168 across lines 153 and 154.

Sliders 161ª, 162ª, 164ª and 165ª are mechanically coupled to move together to corresponding positions on their respective associated resistance elements, and may assumed to be so moved through a follow-up device like 122 shown in Fig. 1 and the mechanical interconnection 123. The effect of adjustment of the sliders of rheostats set 161—162 throughout their range is to vary the armature current to reel motor 19 in accordance with the curve B of Fig. 3, and the effect of the adjustment of the sliders of rheostat set 164—165 is to vary the armature current to reel motor 19 according to any one of the family of curves between and inclusive of curves D and E, depending upon the adjustment of the sliders of rheostat set 165—166. Adjustment of the sliders of rheostat set 166—167 is made in accordance with width and weight per unit area of the strip being coiled. It will be apparent that the resultant armature current to reel motor 19 will be in accordance with the family of curves between and including the curves F and G.

The D. C. potential to be impressed across the lines 153 and 154 should be selected in accordance with the average of the rates of acceleration and deceleration of the mill motor. While the inertia compensation for reel motor current will not be as accurate as that afforded by the form of Figs. 1 and 2, it may be sufficiently accurate for certain applications.

I claim:

1. The combination with a material winding system comprising a motor driving a work roll, a motor driving a winding reel, and interconnected speed adjusting means for the motor driving said work roll and said reel to effect coordinated speed adjustment of said motors, of means providing a potential which is adjustable in accordance with the rate of change of strip speed, first rheostat means subjected to said potential and providing an output potential which increases as a function of change in radius of the reel due to the strip being wound thereon, second rheostat means subjected to said potential and providing an output potential which decreases as a function of change in radius of the reel due to the strip being wound thereon, and control means for said reel motor normally acting to maintain the material under constant tension during constant strip speed winding, said control means being subjected to the influence of the output voltages of said rheostat means to maintain the material under constant tension during accelerating and decelerating strip speed winding.

2. The combination according to claim 1 wherein said means which is adjustable in accordance with the rate of change of strip speed comprises a source of constant D. C. potential, and adjustable resistance means for adjusting the D. C. potential supplied to said first and second rheostat means.

3. The combination according to claim 2 together with third rheostat means in circuit with said first rheostat means and said source of constant D.-C. potential, said third rheostat means in accordance with its adjustment affording change in rate of increase in the output potential of said first rheostat means for a given change in reel radius.

4. The combination according to claim 1 wherein said means which is adjustable in accordance with the rate of change of strip speed comprises means providing a potential varying at any instant in accordance with the rate of change in strip speed and wherein said control means comprises magnetic amplifying means having input terminals subjected to the last mentioned potential and compensating control windings in circuit with said first and second rheostat means.

5. The combination according to claim 4 together with a third rheostat means in circuit with said first rheostat means which third rheostat means in accordance with its adjustment affords change in rate of increase in the output potential of said first rheostat means for a given change in reel radius.

6. The combination according to claim 4 wherein said magnetic amplifying means is of the push-pull type.

7. The combination according to claim 6 wherein said push-pull amplifying means comprises a preamplifier stage, an intermediate power stage, and a compensating stage incorporating said compensating control winding.

8. The combination according to claim 7 wherein said compensating stage of the amplifying means has a common and two other input terminals and ballast resistors connected between said common and each of the two other input terminals, and wherein said first and second rheostat means are each connected across said two other input terminals for subjection to a potential which varies in accordance with said potential varying at any instant in accordance with rate of change in strip speed.

9. The combination according to claim 8 wherein said intermediate power stage includes means for adjusting the negative feed back in each push-pull section.

10. The combination according to claim 9 wherein said means providing a potential which varies in accordance with the rate of change of strip speed comprises a generator coupled to the armature of the motor driving the work rolls, a capacitor, and an adjustable resistor connected in circuit with said capacitor, said generator and the input control windings of the preamplifier stage of said amplifying means.

11. In combination, an element for operating on a strip of material, an electric motor driving said element, a reel for said strip, an electric motor driving said reel, a generator supplying the armature of the reel motor, means affording the field winding of said reel motor a given constant excitation, an exciter having its armature connected to said field winding in bucking relation to said means and having a field winding responsive to the armature current of said reel motor for maintaining such current at a predetermined value under constant strip speed winding, said exciter also having a compensating field winding, means providing a potential which varies in accordance with the rate of change of strip speed, and magnetic amplifying means having its input terminals in circuit with the last mentioned means and having its output terminals in circuit with said compensating field winding.

12. The combination according to claim 11 wherein the last recited means comprises compensating control windings for the magnetic amplifying means, a first rheostat set whose slider varies in position with change in radius of the reel due to strip being wound thereon to supply said compensating control windings with a voltage increasing as a function of increase in radius of the reel, and further comprises a second rheostat set whose slider varies in position with change in radius of the reel due to strip being wound thereon to supply said compensating windings with a voltage decreasing as a function of increase in radius of the reel.

References Cited in the file of this patent
UNITED STATES PATENTS

| | | |
|---|---|---|
| 2,462,233 | Stoltz | Feb. 22, 1949 |
| 2,583,074 | Albert et al. | Jan. 22, 1952 |
| 2,634,386 | Pell | Apr. 7, 1953 |
| 2,688,111 | Jones | Aug. 31, 1954 |